(12) United States Patent
Park et al.

(10) Patent No.: US 11,091,571 B2
(45) Date of Patent: Aug. 17, 2021

(54) HYBRID SUPPORTED CATALYST

(71) Applicant: LG Chem, Ltd., Seoul (KR)

(72) Inventors: Sung Ho Park, Daejeon (KR); Heon Yong Kwon, Daejeon (KR); Hyun Jee Kwon, Daejeon (KR); Jin Young Lee, Daejeon (KR); Ki Soo Lee, Daejeon (KR); Dae Sik Hong, Daejeon (KR); Sol Cho, Daejeon (KR); Oh Joo Kwon, Daejeon (KR)

(73) Assignee: LG Chem, Ltd.

( * ) Notice: Subject to any disclaimer, the term of this patent is extended or adjusted under 35 U.S.C. 154(b) by 40 days.

(21) Appl. No.: 16/084,066

(22) PCT Filed: Aug. 18, 2017

(86) PCT No.: PCT/KR2017/009041
§ 371 (c)(1),
(2) Date: Sep. 11, 2018

(87) PCT Pub. No.: WO2018/105852
PCT Pub. Date: Jun. 14, 2018

(65) Prior Publication Data
US 2020/0123290 A1    Apr. 23, 2020

(30) Foreign Application Priority Data

Dec. 5, 2016    (KR) .................. 10-2016-0164337

(51) Int. Cl.
*C08F 210/16*    (2006.01)
*C07F 17/00*    (2006.01)

(52) U.S. Cl.
CPC .......... *C08F 210/16* (2013.01); *C07F 17/00* (2013.01)

(58) Field of Classification Search
None
See application file for complete search history.

(56) References Cited

U.S. PATENT DOCUMENTS

| 5,032,562 | A   |   | 7/1991  | Lo et al.        |             |
|-----------|-----|---|---------|------------------|-------------|
| 5,525,678 | A   |   | 6/1996  | Mink et al.      |             |
| 5,914,289 | A   |   | 6/1999  | Razavi           |             |
| 6,207,606 | B1  | * | 3/2001  | Lue ............. | C08F 210/02 |
|           |     |   |         |                  | 502/102     |
| 6,376,418 | B1  |   | 4/2002  | Shamshoum et al. |             |
| 2004/0176242 | A1 |   | 9/2004 | Ishihama et al.  |             |
| 2005/0203261 | A1 |   | 9/2005 | Sukhadia et al.  |             |
| 2013/0345377 | A1 |   | 12/2013| Ker et al.       |             |
| 2014/0057777 | A1 | * | 2/2014 | Buck ............ | C08F 210/16 |
|           |     |   |         |                  | 502/117     |
| 2015/0133614 | A1 |   | 5/2015 | Hussein et al.   |             |
| 2015/0259455 | A1 |   | 9/2015 | Hlavinka et al.  |             |

| 2016/0068625 | A1 |   | 3/2016  | Yang et al.  |
|--------------|----|---|---------|--------------|
| 2016/0280813 | A1 |   | 9/2016  | Kwon et al.  |
| 2017/0320978 | A1 |   | 11/2017 | Jeong et al. |

FOREIGN PATENT DOCUMENTS

| CN | 101356199    | A   |   | 1/2009  |            |
|----|--------------|-----|---|---------|------------|
| CN | 102227449    | A   |   | 10/2011 |            |
| CN | 103360518    | A   |   | 10/2013 |            |
| CN | 104540859    | A   |   | 4/2015  |            |
| CN | 104910305    | A   |   | 9/2015  |            |
| CN | 105820280    | A   |   | 8/2016  |            |
| EP | 3031831      | A1  |   | 6/2016  |            |
| EP | 3184556      | A1  |   | 6/2017  |            |
| EP | 3184556      | A1  | * | 6/2017  | C08F 4/65927 |
| JP | 2011089019   | A   |   | 5/2011  |            |
| JP | 2011137146   | A   |   | 7/2011  |            |
| JP | 2011137146   | A   | * | 7/2011  |            |
| KR | 20000070672  | A   |   | 11/2000 |            |
| KR | 100645271    | B1  |   | 11/2006 |            |
| KR | 20150027235  | A   |   | 3/2015  |            |
| KR | 20160029718  | A   |   | 3/2016  |            |
| KR | 20160069467  | A   |   | 6/2016  |            |
| KR | 20160072068  | A   |   | 6/2016  |            |
| KR | 20160076415  | A   |   | 6/2016  |            |
| KR | 20160091004  | A   |   | 8/2016  |            |
| KR | 20170075531  | A   |   | 7/2017  |            |
| WO | 2009117128   | A1  |   | 9/2009  |            |
| WO | 2013151863   | A1  |   | 10/2013 |            |
| WO | 2014099303   | A1  |   | 6/2014  |            |
| WO | 2015065681   | A1  |   | 5/2015  |            |
| WO | 2016093678   | A1  |   | 6/2016  |            |
| WO | 2016171807   | A1  |   | 10/2016 |            |
| WO | 2019025528   | A1  |   | 2/2019  |            |

OTHER PUBLICATIONS

JP-2011137146-A, Jul. 2011, Partial machine translation (Year: 2011).*
Search report from International Application No. PCT/KR2017/009041, dated Nov. 28, 2017.
Loukova, G.V. et al., "Ligand-to-Metal Charge Transfer Excited States with Unprecedented Luminescence Yield in Fluid Solution," Journal of Physical Chemistry A—Letters. vol. 111, No. 20, published on Web May 3, 2007, pp. 4117-4121.
Extended European Search Report including Written Opinion for EP17878569.7 dated May 17, 2019.
Chinese Search Report for Application No. 201780021687.9 dated Jul. 3, 2020, 2 pages.
Chinese Search Report for Application No. 201780021687.9 dated Dec. 9, 2020, pp. 1-3.

* cited by examiner

*Primary Examiner* — Satya B Sastri
(74) *Attorney, Agent, or Firm* — Lerner, David, Littenberg, Krumholz & Mentlik, LLP

(57) ABSTRACT

The present invention provides a hybrid supported catalyst capable of easily preparing an olefin polymer capable of having improved melt strength even while having appropriate molecular weight distribution, and thus having improved bubble stability and exhibiting excellent blown film processability, and a method for preparing an olefin polymer using the same.

8 Claims, No Drawings

HYBRID SUPPORTED CATALYST

CROSS-REFERENCE TO RELATED APPLICATION(S)

This application is a national phase entry under 35 U.S.C. § 371 of International Application No. PCT/KR2017/009041, filed Aug. 18, 2017, which claims priority to Korean Patent Application No. 10-2016-0164337, filed Dec. 5, 2016, the disclosures of which are incorporated herein by reference.

TECHNICAL FIELD

The present invention relates to a hybrid supported catalyst capable of easily preparing an olefin polymer having excellent blown film processability.

BACKGROUND ART

Olefin polymerization catalyst systems can be classified into Ziegler-Natta and metallocene catalyst systems, and these two highly active catalyst systems have been developed in compliance with their characteristics. Ziegler-Natta catalyst has been widely applied to existing commercial processes since it was developed in the 1950's. However, since the Ziegler-Natta catalyst is a multi-active site catalyst in which a plurality of active sites are mixed, it has a feature that molecular weight distribution of polymers is broad. Also, since compositional distribution of comonomers is not uniform, there is a problem that it has a limitation to secure the desired physical properties.

Meanwhile, the metallocence catalyst comprises a combination of a main catalyst whose main component is a transition metal compound, and an organometallic compound cocatalyst whose main component is aluminium. Such a catalyst is a single-site catalyst which is a homogeneous complex catalyst, and offers a polymer having a narrow molecular weight distribution and a uniform composition distribution of comonomers, depending on the single site characteristics. The metallocence catalyst has characteristics capable of changing the stereoregularity, copolymerization properties, molecular weight, degree of crystallinity and the like of the polymer by changing the ligand structure of the catalyst and the polymerization condition.

Specifically, U.S. Pat. No. 5,032,562 discloses a method of preparing a polymerization catalyst by supporting two different transition metal catalysts on one support. This catalyst is prepared by supporting a titanium(Ti)-based Ziegler-Natta catalyst which produces a high molecular weight polymer and a zirconium(Zr)-based metallocene catalyst which produces a low molecular weight polymer on one support, and results in a bimodal molecular weight distribution. This catalyst is disadvantageous in that the supporting procedure is complicated and morphology of polymers is poor due to a cocatalyst.

U.S. Pat. No. 5,525,678 discloses a method of using a catalyst system for olefin polymerization, in which a metallocene compound and a non-metallocene compound are simultaneously supported on a support to realize simultaneous polymerization of a high molecular weight polymer and a low molecular weight polymer. However, there are disadvantages that the metallocene compound and non-metallocene compound must be separately supported and the support must be pretreated with various compounds for supporting reactions.

U.S. Pat. No. 5,914,289 discloses a method of controlling the molecular weight and the molecular weight distribution of polymers using metallocene catalysts which are supported on respective supports. However, a large amount of solvent and a long period of time are required to prepare the supported catalysts, and the process of supporting metallocene catalysts on the respective supports is troublesome.

Therefore, in order to solve the above-mentioned disadvantages, there is a continuing need to develop a method for preparing olefinic polymers with the desired physical properties by easily preparing a hybrid supported metallocene catalyst having an excellent activity.

DETAILED DESCRIPTION OF THE INVENTION

Technical Problem

It is an object of the present invention to provide a hybrid supported catalyst capable of easily preparing an olefin polymer having improved melt strength even while having an appropriate molecular weight distribution, and thus exhibiting excellent blown film processability, and a method for preparing the same.

It is another object of the present invention to provide an olefin polymer prepared using the above-mentioned hybrid supported catalyst.

Technical Solution

According to one embodiment of the present invention, there may be provided a hybrid supported catalyst comprising:

one or more types of a first transition metal compound selected among compounds represented by the following Chemical Formula 1;

one or more types of a second transition metal compound selected among compounds represented by the following Chemical Formula 2; and a support supporting the first and second transition metal compounds.

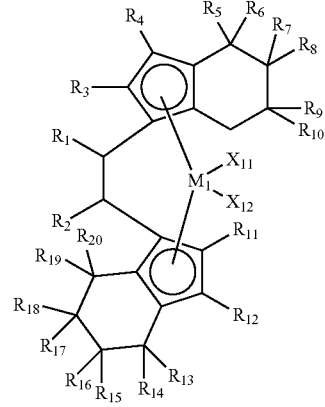

[Chemical Formula 1]

in the above formula 1, $M_1$ is a Group 4 transition metal, $X_{11}$ and $X_{12}$ are the same as or different from each other and each independently represent any one of a halogen, a nitro group, an amido group, a phosphine group, a phosphide group, a hydrocarbyl group having 1 to 30 carbon atoms, a hydrocarbyloxy group having 1 to 30 carbon atoms, a hydrocarbyl oxyhydrocarbyl group having 2 to 30 carbon atoms, —SiH$_3$, a hydrocarbyl(oxy)silyl group having 1 to 30 carbon atoms, a sulfonate group having 1 to 30 carbon atoms and a sulfone group having 1 to 30 carbon atoms, R$_1$ and R$_2$ are the same as or different from each other and each independently represent any one of hydrogen and a hydrocarbyl group having 1 to 30 carbon atoms, or are connected with each other to form an aliphatic or aromatic ring, R$_3$ to R$_{20}$ are the same as or different from each other and are each independently selected from the group consisting of hydrogen, a hydrocarbyl group having 1 to 30 carbon atoms, a hydrocarbyloxy group having 1 to 30 carbon atoms, and a hydrocarbyloxy hydrocarbyl group having 2 to 30 carbon atoms;

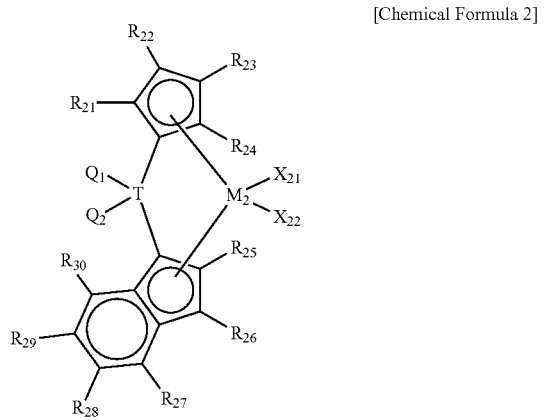

[Chemical Formula 2]

in the above formula 2,

M$_2$ is a Group 4 transition metal,

X$_{21}$ and X$_{22}$ are the same as or different from each other and each independently represent any one of a halogen, a nitro group, an amido group, a phosphine group, a phosphide group, a hydrocarbyl group having 1 to 30 carbon atoms, a hydrocarbyloxy group having 1 to 30 carbon atoms, a hydrocarbyloxyhydrocarbyl group having 2 to 30 carbon atoms, —SiH$_3$, a hydrocarbyl(oxy)silyl group having 1 to 30 carbon atoms, a sulfonate group having 1 to 30 carbon atoms and a sulfone group having 1 to 30 carbon atoms, R$_{21}$ to R$_{30}$ are the same as or different from each other and are each independently selected from the group consisting of hydrogen, a hydrocarbyl group having 1 to 30 carbon atoms, a hydrocarbyloxy group having 1 to 30 carbon atoms, and a hydrocarbyloxy hydrocarbyl group having 2 to 30 carbon atoms;

T is C, Si, Ge, Sn or Pb,

Q$_1$ and Q$_2$ are the same as or different from each other and each independently represent any one of hydrogen, a hydrocarbyl group having 1 to 30 carbon atoms, a hydrocarbyloxy group having 1 to 30 carbon atoms, a hydrocarbyloxy hydrocarbyl group having 2 to 30 carbon atoms, —SiH$_3$, a hydrocarbyl(oxy)silyl group having 1 to 30 carbon atoms, a hydrocarbyl group having 1 to 30 carbon atoms substituted with halogen, and —NR$_a$R$_b$, and R$_a$ and R$_b$ are the same as or different from each other and each independently represent any one of hydrogen and a hydrocarbyl group having 1 to 30 carbon atoms, or are connected with each other to form an aliphatic or aromatic ring.

Specifically, in the hybrid supported catalyst, the first transition metal compound may be a compound in which in Chemical Formula 1 R$_1$ and R$_2$ are the same as or different from each other and each independently represent hydrogen or an alkyl group having 1 to 20 carbon atoms, or are connected with each other to form an aliphatic or aromatic ring.

Further, the first transition metal compound may be a compound in which in Chemical Formula 1 M$_1$ is Ti, Zr or Hf, X$_{11}$ and X$_{12}$ are the same as or different from each other and each independently represent a halogen group, R$_1$ and R$_2$ are the same as or different from each other and each independently represent hydrogen, an alkyl group having 1 to 20 carbon atoms, or are connected with each other to form an aliphatic ring, R$_3$ and R$_4$ are the same as or different from each other and each independently represent any one of hydrogen, an alkyl group having 1 to 20 carbon atoms, an alkoxy group having 1 to 20 carbon atoms, and an alkenyl group having 2 to 20 carbon atoms, R$_5$ to R$_{10}$ are the same as or different from each other and each independently represent any one of hydrogen, an alkyl group having 1 to 20 carbon atoms, an alkoxy group having 1 to 20 carbon atoms, and an alkenyl group having 2 to 20 carbon atoms, or one or more pairs of adjacent substituents of R$_5$ to R$_{10}$ are connected with each other to form a substituted or unsubstituted aliphatic ring.

More specifically, the first transition metal compound may be any one of the compounds represented by the following structural formulas.

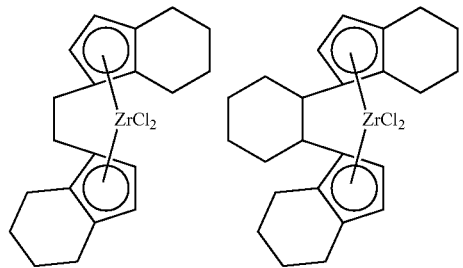

Further, in the hybrid supported catalyst, the second transition metal compound may be a compound in which in Chemical Formula 2, R$_{25}$, and R$_{27}$ to R$_{30}$ are each hydrogen, R$_{26}$ is any one of an alkyl group having 1 to 20 carbon atoms, an alkoxy group having 1 to 20 carbon atoms, an alkenyl group having 2 to 20 carbon atoms, an aryl group having 6 to 20 carbon atoms, an arylalkyl group having 7 to 20 carbon atoms, and an alkylaryl group having 7 to 20 carbon atoms.

Further, the second transition metal compound may be a compound in which in Chemical Formula 2 M$_2$ is Ti, Zr or Hf, X$_{21}$ and X$_{22}$ are the same as or different from each other and each independently represent any one of a halogen, an alkyl group having 1 to 20 carbon atoms and an alkoxy group having 1 to 20 carbon atoms, R$_{21}$ to R$_{24}$ are the same as or different from each other and each independently represent any one of hydrogen, an alkyl group having 1 to 20 carbon atoms, an alkoxy group having 1 to 20 carbon atoms, and an alkenyl group having 2 to 20 carbon atoms, R$_{25}$, and R$_{27}$ to R$_{30}$ are each hydrogen, R$_{26}$ is any one of an alkyl group having 1 to 20 carbon atoms, or an aryl group having 6 to 20 carbon atoms, T is C or Si, Q$_1$ and Q$_2$ are each independently an alkyl group having 1 to 20 carbon atoms, an alkoxy group having 1 to 20 carbon atoms, and an alkoxyalkyl group having 2 to 20 carbon atoms.

More specifically, the second transition metal compound may be any one of the compounds represented by the following structural formulas.

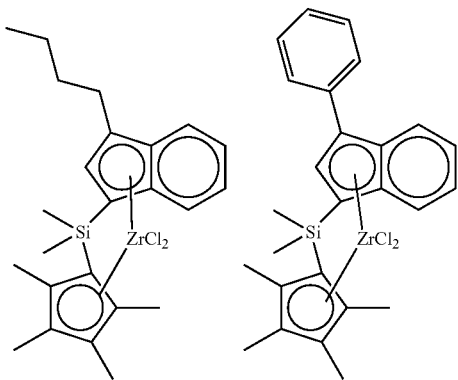

Further, in the hybrid supported catalyst, the first transition metal compound and the second transition metal compound may be contained in a mixing molar ratio of 10:1 to 1:1

Further, in the hybrid supported catalyst, the support may include any one selected from the group consisting of silica, alumina, and magnesia, or a mixture of two or more thereof.

Further, the hybrid supported catalyst may further include at least one cocatalyst selected from the group consisting of compounds represented by the following Chemical Formulas 3 to 5:

$$R_{32}-[Al(R_{31})-O]_n-R_{33}$$ [Chemical Formula 3]

in the above formula 3, $R_{31}$, $R_{32}$ and $R_{33}$ are each independently any one of hydrogen, a halogen, a hydrocarbyl group having 1 to 20 carbon atoms and a hydrocarbyl group having 1 to 20 carbon atoms substituted with a halogen, n is an integer of 2 or more, $$D(R_{34})_3$$ [Chemical Formula 4]

in the above formula 4,

D is aluminum or boron, each $R_{34}$ is independently any one of a halogen, a hydrocarbyl group having 1 to 20 carbon atoms, a hydrocarbyloxy group having 1 to 20 carbon atoms, and a hydrocarbyl group having 1 to 20 carbon atoms substituted with a halogen, $$[L-H]^+[W(A)_4]^- \text{ or } [L]^+[W(A)_4]^-$$ [Chemical Formula 5]

in the above formula 5,

L is a neutral or cationic Lewis base, H is a hydrogen atom,

W is a Group 13 element, each A is independently a hydrocarbyl group having 1 to 20 carbon atoms; a hydrocarbyloxy group having 1 to 20 carbon atoms; and substituents in which at least one hydrogen atom of the above substituents is substituted with at least one substituent selected among a halogen, a hydrocarbyloxy group having 1 to 20 carbon atoms and a hydrocarbyl(oxy)silyl group having 1 to 20 carbon atoms.

According to another embodiment of the present invention, there is provided a method for preparing an olefin polymer comprising a step of polymerizing an olefin monomer in the presence of the above-mentioned hybrid supported catalyst.

In the preparation method, the olefin monomer may include at least one selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene and 3-chloromethylstyrene.

According to still another embodiment of the present invention, there is provided an olefin polymer prepared by the above-mentioned method and having a molecular weight distribution (MWD) of 2.5 to 4.0 and a melt strength of 50 mN or more, more specifically an ethylene-1-hexene copolymer.

Advantageous Effects

By using the hybrid supported catalyst according to the present invention, it is possible to easily produce an olefin polymer capable of having improved melt strength even while having appropriate molecular weight distribution, and thus having improved bubble stability and exhibiting excellent blown film processability.

Such an olefin polymer exhibits high processability and thus is expected to be utilized as a raw material for various products. In particular, the olefin polymer can stably prepare a film by a melt-blowing process, and thus is expected to be usefully used as a raw material for the product prepared by the melt-blowing process.

DETAILED DESCRIPTION OF THE EMBODIMENTS

Hereinafter, a supported catalyst and a method for preparing an olefin polymer using the supported catalyst according to specific embodiments of the invention will be described.

According to an embodiment of the present invention, there is provided a hybrid supported catalyst comprising:

one or more types of a first transition metal compound selected among compounds represented by the following Chemical Formula 1;

one or more types of a second transition metal compound selected among compounds represented by the following Chemical Formula 2; and a support supporting the first and second transition metal compounds.

[Chemical Formula 1]

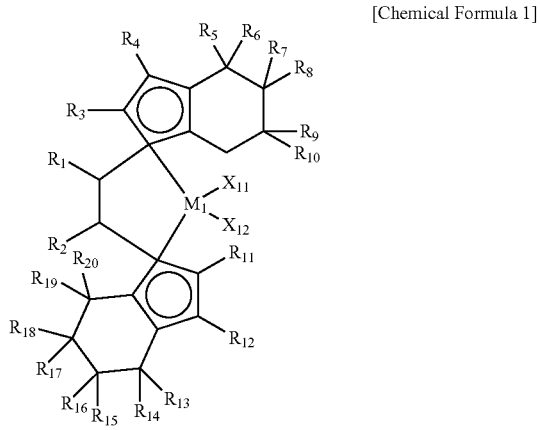

in the above formula 1, $M_1$ is a Group 4 transition metal, $X_{11}$ and $X_{12}$ are the same as or different from each other and each independently represent any one of a halogen, a nitro group, an amido group, a phosphine group, a phosphide group, a hydrocarbyl group having 1 to 30 carbon atoms, a hydrocarbyloxy group having 1 to 30 carbon atoms, a hydrocarbyloxyhydrocarbyl group having 2 to 30 carbon atoms, —$SiH_3$, a hydrocarbyl(oxy)silyl group having 1 to 30 carbon atoms, a sulfonate group having 1 to 30 carbon atoms and a sulfone group having 1 to 30 carbon atoms, $R_1$ and $R_2$ are the same as or different from each other and each independently represent any one of hydrogen and a hydrocarbyl group having 1 to 30 carbon atoms, or are connected with each other to form an aliphatic or aromatic ring, $R_3$ to $R_{20}$ are the same as or different from each other and are each independently selected from the group consisting of hydrogen, a hydrocarbyl group having 1 to 30 carbon atoms, a hydrocarbyloxy group having 1 to 30 carbon atoms, and a hydrocarbyloxy hydrocarbyl group having 2 to 30 carbon atoms;

[Chemical Formula 2]

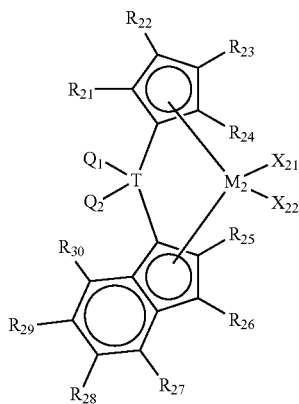

in the above formula 2, $M_2$ is a Group 4 transition metal, $X_{21}$ and $X_{22}$ are the same as or different from each other and each independently represent any one of a halogen, a nitro group, an amido group, a phosphine group, a phosphide group, a hydrocarbyl group having 1 to 30 carbon atoms, a hydrocarbyloxy group having 1 to 30 carbon atoms, a hydrocarbyloxyhydrocarbyl group having 2 to 30 carbon atoms, —$SiH_3$, a hydrocarbyl(oxy)silyl group having 1 to 30 carbon atoms, a sulfonate group having 1 to 30 carbon atoms and a sulfone group having 1 to 30 carbon atoms, $R_{21}$ to $R_{30}$ are the same as or different from each other and are each independently selected from the group consisting of hydrogen, a hydrocarbyl group having 1 to 30 carbon atoms, a hydrocarbyloxy group having 1 to 30 carbon atoms, and a hydrocarbyloxy hydrocarbyl group having 2 to 30 carbon atoms;

T is C, Si, Ge, Sn or Pb, $Q_1$ and $Q_2$ are the same as or different from each other and each independently represent any one of hydrogen, a hydrocarbyl group having 1 to 30 carbon atoms, a hydrocarbyloxy group having 1 to 30 carbon atoms, a hydrocarbyloxy hydrocarbyl group having 2 to 30 carbon atoms, —$SiH_3$, a hydrocarbyl(oxy)silyl group having 1 to 30 carbon atoms, a hydrocarbyl group having 1 to 30 carbon atoms substituted with a halogen, and —$NR_aR_b$, and $R_a$ and $R_b$ are the same as or different from each other and each independently represent any one of hydrogen and a hydrocarbyl group having 1 to 30 carbon atoms, or are connected with each other to form an aliphatic or aromatic ring.

Unless otherwise specified, the following definitions shall apply to the terms used in the specification.

The hydrocarbyl group may be a monovalent functional group in which a hydrogen atom is removed from the hydrocarbon, and may include an alkyl group, an alkenyl group, an alkynyl group, an aryl group, an aralkyl group, an aralkenyl group, an aralkynyl group, an alkylaryl group, an alkenylaryl group, an alkynylaryl group, and the like. Further, the hydrocarbyl group having 1 to 30 carbon atoms may be a hydrocarbyl group having 1 to 20 carbon atoms or 1 to 10 carbon atoms. Specific examples of the hydrocarbyl group having 1 to 30 carbon atoms include linear, branched or cyclic alkyl groups such as methyl group, ethyl group, n-propyl group, iso-propyl group, n-butyl group, iso-butyl group, tert-butyl group, n-pentyl group, n-hexyl group, n-heptyl group, cyclohexyl group, 4-methylcyclohexyl group, 2,3-dimethylcyclohexyl, 4-tert-butylcyclohexyl or cycloheptyl; alkenyl groups such as vinyl, 1-propenyl, iso-propenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, or 2,2-diphenylvinyl-1-yl; or aryl groups, such as phenyl group, naphthyl group, or anthracenyl group.

The hydrocarbyloxy group is a functional group in which the hydrocarbyl group is bonded to oxygen. Specifically, the hydrocarbyloxy group having 1 to 30 carbon atoms may be a hydrocarbyloxy group having 1 to 20 carbon atoms or 1 to 10 carbon atoms. More specifically, the hydrocarbyloxy group having 1 to 30 carbon atoms may be a linear, branched chain or cyclic alkoxy group such as methoxy group, ethoxy group, n-propoxy group, iso-propoxy group, n-butoxy group, iso-butoxy group, tert-butoxy group, n-pentoxy group, n-hectoxy group, n-heptoxy group, or cyclohectoxy group; or an aryloxy group such as phenoxy group or naphthalenoxy group.

The hydrocarbyloxyhydrocarbyl group is a functional group in which at least one hydrogen of the hydrocarbyl group is substituted with at least one hydrocarbyloxy group. Specifically, the hydrocarbyl oxyhydrocarbyl group having 2 to 30 carbon atoms may be a hydrocarbyloxyhydrocarbyl group having 2 to 20 carbon atoms or 2 to 15 carbon atoms. More specifically, the hydrocarbyloxyhydrocarbyl group having 2 to 30 carbon atoms may be an alkoxyalkyl group such as a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group, or a tert-butoxyhexyl group; or an aryloxyalkyl group such as a phenoxyhexyl group.

The hydrocarbyl(oxy)silyl group is a functional group in which one to three hydrogens of —$SiH_3$ are substituted with one to three hydrocarbyl or hydrocarbyloxy groups. Specifically, the hydrocarbyl(oxy)silyl group having 1 to 30 carbon atoms may be a hydrocarbyl(oxy)silyl group having 1 to 20 carbon atoms, 1 to 15 carbon atoms, 1 to 10 carbon atoms, or 1 to 5 carbon atoms. More specifically, the hydrocarbyl(oxy)silyl group having 1 to 30 carbon atoms may be an alkylsilyl group group such as a methylsilyl group, a dimethylsilyl group, a trimethylsilyl group, a dimethylethylsilyl group, a diethylmethylsilyl group or a dimethylpropylsilyl group; an alkoxysilyl group such as a methoxysilyl group, a dimethoxysilyl group, a trimethoxysilyl group or a dimethoxyethoxysilyl group; an alkoxyalkylsilyl group such as a methoxydimethylsilyl group, a diethoxymethylsilyl group or a dimethoxypropylsilyl group, or the like.

The silylhydrocarbyl group having 1 to 20 carbon atoms is a functional group in which at least one hydrogen atom of the hydrocarbyl group is substituted with a silyl group. The silyl group may be —$SiH_3$ or a hydrocarbyl(oxy)silyl group. Specifically, the silylhydrocarbyl group having 1 to 20 carbon atoms may be a silylhydrocarbyl group having 1 to 15 carbon atoms or 1 to 10 carbon atoms. More specifically, the silylhydrocarbyl group having 1 to 20 carbon atoms may be —$CH_2$—$SiH_3$, a methylsilylmethyl group, a dimethylethoxysilylpropyl group, or the like.

The halogen may be fluorine (F), chlorine (Cl), bromine (Br) or iodine (I).

The sulfonate group may have a structure of —O—$SO_2$—$R^a$, wherein $R^a$ is a hydrocarbyl group having 1 to 30 carbon atoms. Specifically, the sulfonate group having 1 to 30 carbon atoms may be a methane sulfonate group, a phenyl sulfonate group, or the like.

The sulfone group having 1 to 30 carbon atoms may have a structure of —$R^{b'}$—$SO_2$—$R^{b''}$ wherein $R^{b'}$ and $R^{b''}$ are the same as or different from each other and each independently represent any one of hydrocarbyl groups having 1 to 30 carbon atoms. Specifically, the sulfone group having 1 to 30 carbon atoms may be a methylsulfonylmethyl group, a methylsulfonylpropyl group, a methylsulfonylbutyl group, a phenylsulfonylpropyl group or the like.

In the present specification, the phrase "adjacent two substituents are connected with each other to form a substituted or unsubstituted aliphatic or aromatic ring" means that an atom(s) of two substituents and an atom (atoms) to which the two substituents are bonded are connected with each other to form a ring. Specifically, examples in which $R_a$ and $R_b$ of —$NR_aR_b$ are connected with each other to form an aliphatic ring include a piperidinyl group or the like, and examples in which $R_a$ and $R_b$ of —$NR_aR_b$ are connected with each other to form an aromatic ring include a pyrrolyl group, or the like.

Within the range that exhibits the same or similar effect as the desired effect, the above-mentioned substituents may be optionally substituted with a hydroxyl group; a halogen; a hydrocarbyl group; a hydrocarbyloxy group; a hydrocarbyl group or hydrocarbyloxy group containing at least one heteroatom selected among Group 14 to 16 heteroatoms; a silyl group; a hydrocarbyl(oxy)silyl group; a phosphine group; a phosphide group; a sulfonate group; and a sulfone group.

Conventionally, olefin polymers prepared using a catalyst having one type of transition metal compound supported thereon exhibited poor bubble stability. Consequently, when olefin polymers prepared using a catalyst having one kind of transition metal compound supported thereon is processed by a melt-blowing process or the like, it has been difficult to stably form a film.

However, when using the hybrid supported catalyst according to an embodiment of the present invention, the melt strength, which is one of important physical properties for determining the bubble stability of the olefin polymer, is strengthened, and thus an olefin polymer having high processability, particularly excellent blown film processability can be prepared. In addition, the hybrid supported catalyst can improve the blown film processability without greatly increasing the molecular weight distribution (MWD).

Specifically, in the hybrid supported catalyst according to an embodiment of the present invention, the first transition metal compound is easy to prepare an olefin polymer containing a long chain branch, and the second transition metal compound is easy to prepare an olefin polymer having a relatively lower molecular weight than that of the first transition metal compound. As described above, the length and number of the long chain branch can be controlled by hybrid-supporting the second transition metal compound capable of forming a macromer with the first transition metal compound capable of incorporation polymerization of a long chain branch in an appropriate ratio, and thus an olefin polymer having an improved melt strength without increasing the molecular weight distribution strength can be prepared.

Specifically, in the hybrid supported catalyst according to one embodiment of the present invention, the first transition metal compound represented by Chemical Formula 1 forms a structure in which two tetrahydroindenyl ligands are cross-linked via an alkylene dibridge, and $M_1(X_{11})(X_{12})$ existing between the tetrahydroindenyl ligands has a structure in which two ligands are connected by a bridge and a metal. Thereby, the incorporation polymerization of a long chain branch is made possible. In addition, it exhibits excellent stability together with excellent catalytic activity.

Moreover, in the structure of the first transition metal compound represented by Chemical Formula 1, it is possible to exhibit stability and high polymerization activity by having an unshared electron pair capable of acting as a Lewis base in the tetrahydroindenyl ligand structure. Also, the tetrahydroindenyl ligand can control the degree of steric hindrance effect depending on the type of the substituted functional group, thereby easily controlling the molecular weight of the olefin polymer prepared.

Specifically, in Chemical Formula 1, $R_3$ and $R_4$ are each independently any one of hydrogen, an alkyl group having 1 to 20 carbon atoms, an alkoxy group having 1 to 20 carbon atoms, and an alkenyl group having 2 to 20 carbon atoms, $R_5$ to $R_{10}$ are each independently any one of hydrogen, an alkyl group having 1 to 20 carbon atoms, an alkoxy group having 1 to 20 carbon atoms, and an alkenyl group having 2 to 20 carbon atoms, or one or more pairs of adjacent substituents of $R_5$ to $R_{10}$ can be connected with each other to form a substituted or unsubstituted aliphatic ring. More specifically, in Chemical Formula 1, $R_3$ and $R_4$ are each independently any one of hydrogen, an alkyl group having 1 to 4 carbon atoms, an alkoxy group having 1 to 4 carbon atoms, and an alkenyl group having 2 to 4 carbon atoms, $R_5$ to $R_{10}$ are each independently any one of hydrogen, an alkyl group having 1 to 4 carbon atoms, an alkoxy group having 1 to 4 carbon atoms, and an alkenyl group having 2 to 4 carbon atoms, or one or more pairs of adjacent substituents of $R_5$ to $R_{10}$ can be connected with each other to form a substituted or unsubstituted aliphatic ring. In such a case, the hybrid supported catalyst can provide an olefin polymer having excellent processability.

Further, in the structure of the first transition metal compound represented by Chemical Formula 1, the two tetrahydroindenyl ligands may be cross-linked by an alkylene group to exhibit excellent stability. In order to more effectively ensure this effect, $R_1$ and $R_2$ are each independently hydrogen or an alkyl group having 1 to 20 carbon atoms, or may be connected with each other to form an aliphatic or aromatic ring. More specifically, $R_1$ and $R_2$ are the same as each other and are hydrogen, or may be connected with each other to form an aliphatic ring having 3 to 10 carbon atoms, more specifically a cyclohexane ring.

Further, in the structure of the first transition metal compound represented by Chemical Formula 1, $M_1(X_{11})(X_{12})$ existing between two tetrahydroindenyl ligands may affect the storage stability of the metal complex. In order to more effectively ensure this effect, $X_{11}$ and $X_{12}$ may be each independently any one of halogen, an alkyl group having 1 to 20 carbon atoms, and an alkoxy group having 1 to 20 carbon atoms. More specifically, $X_{11}$ and $X_{12}$ may be each independently F, Cl, Br or I, and $M_1$ may be Ti, Zr or Hf; Zr or Hf; or Zr.

As an example, as a first transition metal compound capable of providing an olefin polymer having excellent melt strength and thus excellent blown film processability, the compound of Chemical Formula 1 may be a compound represented by the following structural formulas, but is not limited thereto.

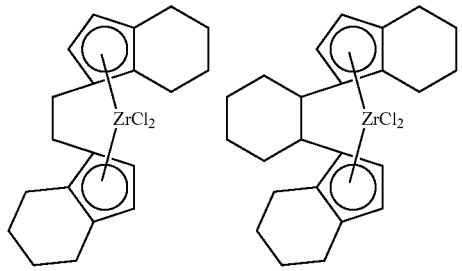

The first transition metal compound represented by Chemical Formula 1 may be synthesized by applying reactions known in the art. Specifically, the first transition metal compound can be prepared by connecting tetrahydroindenyl derivatives via a bridging compound to prepare a ligand compound, and then introducing a metal precursor compound therein to perform a metalation, but not limited thereto. For more detailed synthesis method, reference can be made to examples described later.

Meanwhile, in the hybrid supported catalyst according to one embodiment of the present invention, the second transition metal compound represented by Chemical Formula 2 includes a cyclopentadienyl ligand and an indenyl ligand as different ligands, and has a structure in which the different ligands are cross-linked by $-T(Q_1)(Q_2)-$, and $M_2(X_{21})(X_{22})$ is present between the different ligands. When a transition metal compound having such a specific structure is activated by an appropriate method and used as a catalyst in the polymerization of olefins, the formation of a macromer is made possible.

Specifically, in the structure of the transition metal compound represented by Chemical Formula 2, the cyclopentadienyl ligand may affect, for example, the olefin polymerization activity.

In particular, when $R_{21}$ to $R_{24}$ in the cyclopentadienyl ligand are each independently any one of hydrogen, an alkyl group having 1 to 20 carbon atoms, an alkoxy group having 1 to 20 carbon atoms, and an alkenyl group having 2 to 20 carbon atoms, the catalyst obtained from the transition metal compound of Chemical Formula 2 can exhibit higher activity in the olefin polymerization process, and when $R_{21}$ to $R_{24}$ are each independently any one of a methyl group, an ethyl group, a propyl group and a butyl group, the hybrid supported catalyst can exhibit very high activity in the polymerization process of an olefin monomer.

Further, in the structure of the transition metal compound represented by Chemical Formula 2, the indenyl ligand can control, for example, the degree of the steric hindrance effect depending on the type of the substituted functional group, thereby easily controlling the molecular weight of the olefin polymer prepared.

Specifically, $R_{25}$ to $R_{30}$ in Chemical Formula 2 may be each independently any one of hydrogen, an alkyl group having 1 to 20 carbon atoms, an alkoxy group having 1 to 20 carbon atoms, an alkoxyalkyl group having 2 to 20 carbon atoms, an alkylsilyl group having 1 to 20 carbon atoms, a silylalkyl group having 1 to 20 carbon atoms, an alkoxysilyl group having 1 to 20 carbon atoms, a silyloxyalkyl group having 1 to 20 carbon atoms, an alkenyl group having 2 to 20 carbon atoms, an aryl group having 6 to 20 carbon atoms, an alkylaryl group having 7 to 20 carbon atoms, and an arylalkyl group having 7 to 20 carbon atoms.

In particular, in order to provide an olefin polymer having more excellent processability, $R_{25}$, and $R_{27}$ to $R_{30}$ in Chemical Formula 2 are each hydrogen and $R_{26}$ is an alkyl group having 1 to 20 carbon atoms, an alkoxy group having 1 to 20 carbon atoms, an alkenyl group having 2 to 20 carbon atoms, an aryl group having 6 to 20 carbon atoms, an arylalkyl group having 7 to 20 carbon atoms, and an alkylaryl group having 7 to 20 carbon atoms, and more specifically, an alkyl group having 1 to 20 carbon atoms or an aryl group having 6 to 20 carbon atoms. Also, in consideration of the remarkable improvement effect of the processability due to the type and position of the substituent, $R_{26}$ may be an aryl group having 6 to 20 carbon atoms, more specifically, a phenyl group.

In addition, the cyclopentadienyl ligand and indenyl ligand can be cross-linked by $-T(Q_1)(Q_2)-$, thereby exhibiting excellent stability. In order to more effectively ensure this effect, the transition metal compounds wherein $Q_1$ and $Q_2$ are each independently any one of an alkyl group having 1 to 20 carbon atoms, an alkoxy group having 1 to 20 carbon atoms, and an alkoxyalkyl group having 2 to 20 carbon atoms can be used. More specifically, a transition metal compound in which $Q_1$ and $Q_2$ are the same as each other and is any one of a methyl group, an ethyl group, a propyl group, a butyl group, a phenyl group and a benzyl group can be used. And T may be C, Si, Ge, Sn or Pb; or C or Si; or Si.

Meanwhile, $M_2(X_{21})(X_{22})$ exists between the crosslinked cyclopentadienyl ligand and the indenyl ligand, and $M_2(X_{21})(X_{22})$ may affect the storage stability of the metal complex. In order to more effectively ensure this effect, $X_{21}$ and $X_{22}$ may be each independently any one of a halogen, an alkyl group having 1 to 20 carbon atoms and an alkoxy group having 1 to 20 carbon atoms. More specifically, $X_{21}$ and $X_{22}$ may be each independently F, Cl, Br or I, and $M_2$ is Ti, Zr or Hf; or Zr or Hf; or Zr.

As an example, as a second transition metal compound capable of providing an olefin polymer having more increased melt strength and thus excellent blown film processability, the compound of Chemical Formula 2 may be a compound represented by the following structural formulas, but is not limited thereto.

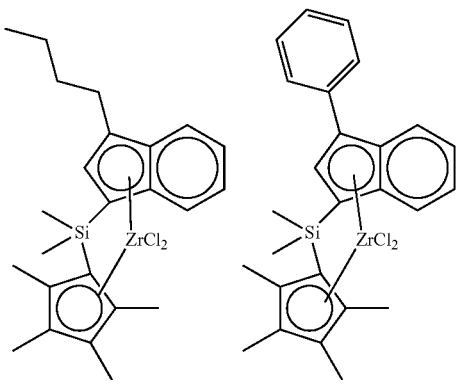

The second transition metal compound represented by Chemical Formula 2 may be synthesized by applying reactions known in the art. Specifically, the second transition metal compound can be prepared by connecting an indenyl derivative and a cyclopentadienyl derivative via a bridging compound to prepare a ligand compound, and then introducing a metal precursor compound therein to perform a metalation, but is not limited thereto. For more detailed synthesis method, reference can be made to examples described later.

Meanwhile, the first and second transition metal compounds have the above-described structural characteristics and thus can be stably supported on the support.

As the support, a support containing a hydroxy group or a siloxane group on its surface can be used. Specifically, a support containing a hydroxy group or a siloxane group having high reactivity can be used as the support by drying it at high temperature to remove moisture on its surface. More specifically, silica, alumina, magnesia, a mixture thereof, or the like can be used as the support. Of these, silica may be more preferable. The support may be one which has been dried at high temperatures and these may typically include oxides, carbonates, sulphates and nitrate components such as $Na_2O$, $K_2CO_3$, $BaSO_4$ and $Mg(NO_3)_2$.

The drying temperature of the support is preferably 200 to 800° C., more preferably 300 to 600° C., and most preferably 300 to 400° C. If the drying temperature of the support is lower than 200° C., it retains moisture too much so that moisture on the surface is reacted with the cocatalyst. If the drying temperature is higher than 800° C., pores on the surface of the support are combined with each other to reduce surface area, and many hydroxyl groups are lost on the surface to remain only siloxane groups. Thus, since the reactive sites with cocatalyst are reduced, it is not preferable.

The amount of hydroxyl group on the surface of the support is preferably 0.1 to 10 mmol/g, and more preferably 0.5 to 5 mmol/g. The amount of hydroxyl group on the surface of the support may be controlled depending on the preparation method and conditions of the support, or drying conditions such as temperature, time, vacuum, spray drying, and the like.

If the amount of hydroxyl group is less than 0.1 mmol/g, the reactive sites with cocatalyst are reduced. If the amount of hydroxyl group is more than 10 mmol/g, it is not desirable because it may be caused by moisture besides the hydroxyl groups present on the surface of support particles.

Meanwhile, the hybrid supported catalyst according to one embodiment of the invention may further include a cocatalyst in order to activate the transition metal compound which is a catalyst precursor. The cocatalyst is an organometallic compound containing a Group 13 metal and is not particularly limited as long as it can be used in the polymerization of olefins in the presence of a general metallocene catalyst. Specifically, the cocatalyst can be one or more compounds selected from the group consisting of the compounds represented by Chemical Formulas 3 to 5 below.

$$R_{32}-[Al(R_{31})-O]_n-R_{33} \quad \text{[Chemical Formula 3]}$$

in the above formula 3, $R_{31}$, $R_{32}$ and $R_{33}$ are each independently any one of hydrogen, a halogen, a hydrocarbyl group having 1 to 20 carbon atoms and a hydrocarbyl group having 1 to 20 carbon atoms substituted with a halogen, and n is an integer of 2 or more, $$D(R_{34})_3 \quad \text{[Chemical Formula 4]}$$

in the above formula 4,

D is aluminum or boron, three $R_{34}$ are each independently any one of a halogen, a hydrocarbyl group having 1 to 20 carbon atoms, a hydrocarbyloxy group having 1 to 20 carbon atoms, and a hydrocarbyl group having 1 to 20 carbon atoms substituted with a halogen, $$[L-H]^+[W(A)_4]^- \text{ or } [L]^+[W(A)_4]^- \quad \text{[Chemical Formula 5]}$$

in the above formula 5,

L is a neutral or cationic Lewis base, H is a hydrogen atom,

W is a Group 13 element, and four A are each independently any one of a hydrocarbyl group having 1 to 20 carbon atoms; a hydrocarbyloxy group having 1 to 20 carbon atoms; and substituents in which at least one hydrogen atom of the above substituents is substituted with at least one substituent of halogen, a hydrocarbyloxy group having 1 to 20 carbon atoms and a hydrocarbyl(oxy)silyl group having 1 to 20 carbon atoms.

Non-limiting examples of the compound represented by Chemical Formula 3 include methyl aluminoxane, ethyl aluminoxane, isobutyl aluminoxane, tert-butyl aluminoxane, and the like, and non-limiting examples of the compound represented by Chemical Formula 4 include trimethyl aluminum, triethyl aluminum, triisobutyl aluminum, tripropyl aluminum, tributyl aluminum, dimethylchloro aluminum, triisopropyl aluminum, tri-sec-butylaluminium, tricyclopentyl aluminium, triphentylaluminum, triisopentyl aluminum, trihexyl aluminum, trioctyl aluminum, ethyl dimethyl aluminum, methyl diethyl aluminum, triphenyl aluminum, tri-p-tolyl aluminum, dimethyl aluminum methoxide, dimethyl aluminum ethoxide or the like. Finally, non-limiting examples of the compound represented by Chemical Formula 5 include trimethylammonium tetrakis(pentafluorophenyl) borate, triethylammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxy tris(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, N,N-dimethylanilinium tetrakis(2,3,4,6-tetrafluorophenyl)borate, hexadecyldimethylammonium tetrakis(pentafluorophenyl)borate, N-methyl-N-dodecyl anilinium tetrakis(pentafluorophenyl)borate, methyldi(dodecyl)ammonium tetrakis(pentafluorophenyl)borate, and the like.

Such hybrid supported catalyst can be prepared, for example, by a method comprising the steps of supporting a cocatalyst on a support and supporting the first and second transition metal compounds as the catalyst precursor on the cocatalyst-supported support.

Specifically, in the step of supporting the cocatalyst on the support, a cocatalyst-supported support may be prepared by adding a cocatalyst to a support dried at a high temperature and stirring the resultant at a temperature of about 20 to 120° C.

Further, in the step of supporting the catalyst precursor on the cocatalyst-supported support, a supported catalyst can be prepared by adding a transition metal compound to the cocatalyst-supported support obtained in the step of supporting the cocatalyst on the support, and then stirring the resultant at a temperature of about 20 to 120° C.

In the step of supporting a transition precursor on the cocatalyst-supported support, a supported catalyst can be prepared by adding a transition metal compound to the cocatalyst-supported support, stirring the resultant and then further adding a cocatalyst thereto.

The content of the support, cocatalyst, the cocatalyst-supported support and the transition metal compound used in the hybrid supported catalyst according to one embodiment of the present invention can be appropriately controlled according to the desired physical properties and effects of the supported catalyst.

Specifically, in the hybrid supported catalyst according to one embodiment of the present invention, the mixing molar ratio of the first transition metal compound and the second transition metal compound may be 10:1 to 1:1, more specifically 7:1 to 3:1. By including the first and second transition metal compounds at the above mixing molar ratio, the length and number of the long chain branch can be controlled and the melt strength is increased without increasing the molecular weight distribution, and thereby, the olefin polymer having excellent bubble stability and blown film processability can be more easily prepared.

Further, in the hybrid supported catalyst according to one embodiment of the present invention, a weight ratio of the total transition metal compounds including the first and second transition metal compounds to the support may be 1:10 to 1:1,000, more specifically 1:10 to 1:500. When including the support and the metallocene compound at the above weight ratio, an optimal shape may be obtained.

Further, when the hybrid supported catalyst further includes a cocatalyst, a weight ratio of the cocatalyst to the support may be 1:1 to 1:100, more specifically 1:1 to 1:50. When including the cocatalyst and the support at the above weight ratio, the activity and microstructure of the polymer may be optimized.

As a reaction solvent used in the preparation of the hybrid supported catalyst, a hydrocarbon solvent such as pentane, hexane, heptane, etc., or an aromatic solvent such as benzene, toluene, etc. may be used.

For detailed preparation method of the supported catalyst, reference can be made to examples described later. However, the method for preparing the supported catalyst is not limited to the contents described in the present specification, and the preparation method can further adopt the steps commonly employed in the technical field to which the present invention belongs. The step(s) of the preparation method described above can be typically modified by a changeable step(s).

Meanwhile, according to another embodiment of the present invention, there is provided a method for preparing an olefin polymer comprising a step of polymerizing an olefin monomer in the presence of the hybrid supported catalyst.

As described above, since the hybrid supported catalyst has a specific structure, the melt strength is increased without increasing the molecular weight distribution, as compared with the polyolefin polymerized using a conventional transition metal compound catalyst, and thereby an olefin polymer having excellent bubble stability and blown film processability can be prepared.

Examples of the olefin monomer that can be polymerized by the hybrid supported catalyst includes ethylene, alpha-olefin, cyclic olefin, or the like, and diene olefin monomers or triene olefin monomers having two or more double bonds can also be polymerized. Specific examples of the monomers may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene, etc., and these monomers may be copolymerized by mixing two or more thereof. When the olefin polymer is a copolymer of ethylene and another comonomer, the comonomer is preferably at least one comonomer selected from the group consisting of propylene, 1-butene, 1-hexene, 4-methyl-1-pentene and 1-octene.

For the polymerization reaction of the above olefin monomer, various polymerization processes that are known as a polymerization reaction of olefin monomer such as a continuous solution polymerization process, a bulk polymerization process, a suspension polymerization process, a slurry polymerization process, or an emulsion polymerization process can be employed.

Specifically, the polymerization reaction may be carried out at a temperature of about 50 to 110° C. or about 60 to 100° C. and a pressure of about 1 to 100 kgf/cm$^2$ or about 1 to 50 kgf/cm$^2$.

Further, in the polymerization reaction, the hybrid supported catalyst may be used in a state of being dissolved or diluted in a solvent such as pentane, hexane, heptane, nonane, decane, toluene, benzene, dichloromethane, chlorobenzene or the like. At this time, by treating the solvent with a small amount of alkyl aluminum or the like, a small amount of water, air or the like which can adversely affect the catalyst can be removed beforehand.

The olefin polymer prepared by the above-described method exhibits a high melt strength without increasing the molecular weight distribution by being prepared using the above-described hybrid supported catalyst, and as a result, it can exhibit excellent bubble stability and blown film processability.

Specifically, the olefin polymer may have a molecular weight distribution (MWD) of 2.5 to 4.0, more specifically 2.8 to 3.5, more specifically 3.0 to 3.5, and a melt strength of 50 mN or more, more specifically 50 mN to 70 mN.

Further, the olefin polymer has the above-mentioned molecular weight distribution and melt strength characteristics and has a weight average molecular weight of 10,000 g/mol to 5,000,000 g/mol, more specifically 100,000 g/mol to 200,000 g/mol.

In addition, the olefin polymer may have a melt index of 0.8 g/10 min to 1.1 g/10 min, more specifically 0.89 g/10 min to 1.1 g/10 min, which is measured at a temperature of 190° C. under a load of 2.16 kg according to standard ASTM D1238. Further, the olefin polymer may have MFRR(21.6/ 2.16) of 30 to 90, more specifically 50 to 70, still more specifically 50 to 60 in which a melt flow index (MFR$_{21.6}$) measured at a temperature of 190° C. under a load of 21.6 kg according to ISO 1133 is divided by a melt flow index (MFR$_{2.16}$) measured at a temperature of 190° C. under a load of 2.16 kg according to ISO 1133.

When the polymer that is polymerized by using the above-mentioned hybrid supported catalyst is, for example, an ethylene-alpha olefin copolymer, preferably an ethylene-1-hexene copolymer, the above-mentioned physical characteristics can be more suitably satisfied.

The actions and effects of the invention will be described in more detail by way of concrete examples below. However, these examples are presented for illustrative purposes only and the scope of the invention is not limited thereto in any way.

Synthesis Example 1: First Transition Metal Compound (A)

(A)

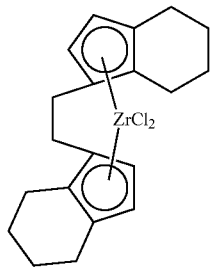

Dichloro[rac-ethylenebis(4,5,6,7-tetrahydro-1-indenyl)] zirconium (IV) (cas number 100163-29-9, manufactured by Sigma-Aldrich) (A) represented by the above structural formula was prepared.

Synthesis Example 2: First Transition Metal Compound (B)

(B)

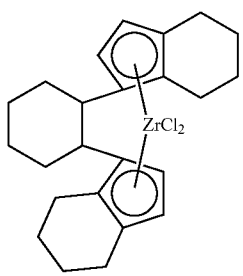

The compound (B) represented by the above structural formula was synthesized by referring to the method described in Journal of Physical Chemistry A, 2007, 111, 4117.

Synthesis Example 3: Second Transition Metal Compound (C)

Step 1)

Tetramethylcyclopentadiene (TMCP, 6.0 mL, 40 mmol) was dissolved in THF (60 mL) in a dried 250 mL schlenk flask, and then the solution was cooled to −78° C. Then, n-BuLi (2.5 M, 17 mL, 42 mmol) was slowly added dropwise to the solution and then the obtained solution was stirred at room temperature overnight. Meanwhile, dichlorodimethylsilane (4.8 mL, 40 mmol) was dissolved in n-hexane in another 250 mL schlenk flask, and the solution was cooled to −78° C. Then, the previously prepared TMCP-lithiation solution was slowly added to this solution. And the obtained solution was stirred at room temperature overnight. Subsequently, the obtained solution was subjected to reduced pressure to remove the solvent from the solution. The resulting solid was dissolved in toluene and filtered to remove residual LiCl, thereby obtaining chlorodimethyl[2,3,4,5-tetramethylcyclopenta-2,4-dien-1-yl]silane as an intermediate (yellow liquid, 7.0 g, 33 mmol, 83% yield).

$^1$H NMR (500 MHz, CDCl$_3$): 0.24 (6H, s), 1.82 (6H, s), 1.98 (6H, s), 3.08 (1H, s).

Step 2)

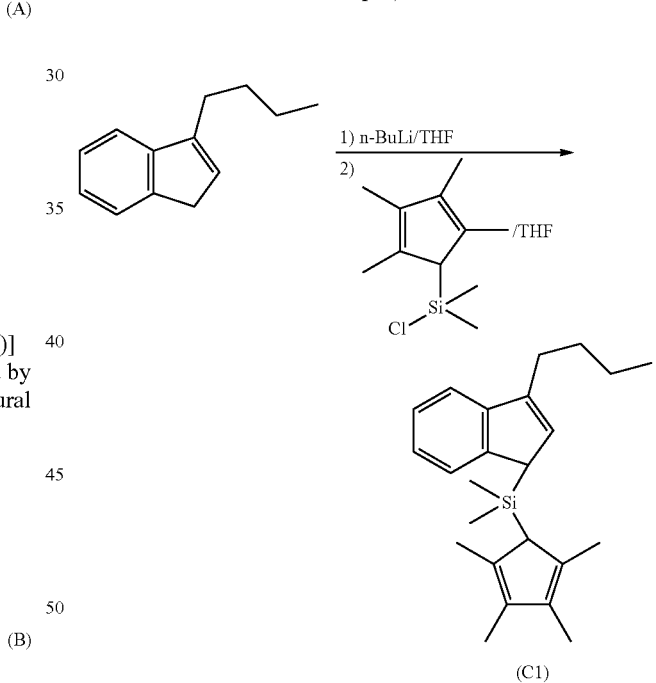

(C1)

3-Butyl-1H-indene (560 mg, 3.3 mmol) was dissolved in THF (20 mL) in a dried 100 mL schlenk flask and then the solution was cooled to −78° C. Then, n-BuLi (2.5 M, 1.4 mL, 3.4 mmol) was slowly added dropwise to the solution, and then the obtained solution was stirred at room temperature for about 2.5 hours. Meanwhile, the previously synthesized intermediate (700 mg, 3.3 mmol) was dissolved in THF in another 100 mL schlenk flask, and the solution was cooled to −78° C. Then, the previously prepared indene-lithiation solution was slowly added to this solution. The obtained solution was stirred at room temperature overnight to obtain a purple solution. Then, water was poured into the reactor to quench the reaction, and the organic layer was extracted from the mixture with ether to obtain a ligand (cl) in the form of a yellow liquid (1.1 g, 3.2 mmol, 98% yield).

$^1$H NMR (500 MHz, CDCl$_3$): −0.45 (3H, s), −0.15 (3H, s), 0.97 (3 h, t), 1.45 (2H, m), 1.67 (2H, m), 1.86 (6H, s), 2.01 (6H, d), 2.60 (2H, t), 3.04 (1H, s), 3.50 (1H, s), 6.19 (1H, s), 7.15-7.18 (1H, m), 7.24-7.26 (1H, m), 7.40 (2H, d).

Step 3)

The previously synthesized ligand (1.1 g, 3.2 mmol) was dissolved in THF (30 mL) in a dried 100 mL schlenk flask and then the solution was cooled to −78° C. n-BuLi (2.5 M, 2.6 mL, 6.4 mmol) was added to the obtained solution and the mixture was stirred at room temperature overnight. Meanwhile, in a separately prepared 100 mL schlenk flask, ZrCl$_4$ (THF)$_2$ (1.2 g, 3.2 mmol) was dispersed in 30 ml of toluene, and the obtained mixture was cooled to −78° C. Then, the lithiated ligand solution previously prepared was slowly injected in the mixture. The obtained mixture was then stirred for 4 hours, and then the solvent was removed under reduced pressure, precipitated with n-hexane and filtered. As a result, the reaction product was present in both filter cake and filtrate (1.1 g, 2.1 mmol, 65% yield). The filter cake, which is a mixture with LiCl, was extracted with toluene to separate only the reaction product. Thereby, the second transition metal compound (C) was prepared (650 mg, 1.3 mmol, 40% yield).

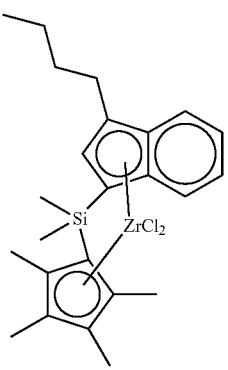

(C)

$^1$H NMR (500 MHz, CDCl$_3$): 0.93 (3H, t), 1.16 (3H, s), 1.37-1.41 (2H, m), 1.57-1.77 (2H, m), 1.89 (3H, s), 1.93 (6H, d), 2.00 (3H, s), 2.82-3.00 (2H, m), 5.56 (1H, s), 7.04 (1H, t), 7.32 (1H, t), 7.46 (1H, d), 7.57 (1H, d).

Synthesis Example 4: First Transition Metal Compound (D)

To a solution (25 ml) prepared by dissolving chlorodimethyl(2,3,4,5-tetramethylcyclopentadi-2,4-dien-1-yl)silane (5.00 g, 23.3 mmol) in ether was added lithium(1-phenylindenide) (4.85 g, 24.4 mmol) at −35° C. and the mixture was reacted with stirring for 23 hours. After completion of the reaction, the volatile materials were removed under vacuum, and the resulting reaction product was extracted with pentane (40 ml) and filtered. The resulting solution was evaporated in vacuo to obtain dimethyl(3-phenyl-1H-indenyl)(2,3,4,5-tetramethylcyclopentadienylsilane as a thick oil.

To a solution (25 ml) prepared by dissolving the prepared dimethyl(3-phenyl-1H-indenyl)(2,3,4,5-tetramethylcyclopentadienylsilane(7.03 g, 19.0 mmol) in ether was added a hexane solution of 2.63 M butyllithium (14.8 ml, 38.9 mmol) at −35° C. and the mixture was reacted with stirring for 20 minutes. The resulting reaction product was filtered to obtain a solid. The resulting solid was washed with pentane (twice×40 ml) and dried under vacuum to obtain dilithium [tetramethylcyclopentadienide dimethylsilyl (3-phenylindenide) 1.10 etherate.

To a dispersion (25 ml) in which zirconium tetrachloride bis(etherate) (2.00 g, 5.25 mmol) was dispersed in ether was added dilithium[tetramethylcyclopentadienide dimethylsilyl (3-phenylindenide) 1.10 etherate (2.43 g, 5.24 mmol) prepared above at −35° C. and reacted with stirring for 16 hours. After completion of the reaction, the reaction solution was evaporated in vacuo to obtain a solid. The obtained solid was extracted with 50 ml of dichloromethane and then extracted three times with 10 ml each time. The extract was filtered and the resulting solution was evaporated in vacuo to obtain a solid. The solid was washed with pentane (2×20 ml) and dried under vacuum to obtain a second transition metal compound (D) having the following structure.

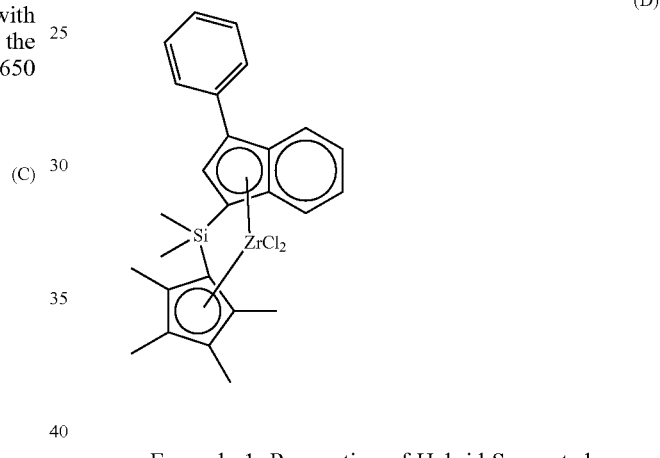

(D)

Example 1: Preparation of Hybrid Supported Catalyst and Olefin Polymer Using the Same (1) Preparation of Support Silica (SP™ 952, manufactured by Grace Davision) was dehydrated and dried at a temperature of 600° C. under vacuum for 12 hours.

(2) Preparation of Cocatalyst-Supported Support 20 g of the dried silica was added to a glass reactor, methylaluminoxane (MAO) solution containing aluminum in an amount of 13 mmol was added to the toluene solution, and slowly reacted with stirring at 40° C. for 1 hour. After completion of the reaction, the reaction product was washed several times with a sufficient amount of toluene until the unreacted aluminum compound was completely removed, and then subjected to reduced pressure at 50° C. to remove the remaining toluene. As a result, 32 g of a cocatalyst-supported support (MAO/SiO$_2$) was obtained (Al content in the supported catalyst=17% by weight).

(3) Preparation of Hybrid Supported Support 12 g of the cocatalyst-supported support (MAO/SiO$_2$) prepared above was added to a glass reactor, and 70 ml of toluene was added thereto and stirred. A solution prepared by dissolving the compound (A) (1.2 mmol) prepared in Synthesis Example 1 as a first transition metal compound in toluene was added to the glass reactor and reacted with stirring at 40° C. for 1 hour. Further, the compound (C) prepared in Synthesis Example 3 was continuously added as a second transition metal compound and reacted under the same conditions. The resultant reaction product was washed with a sufficient amount of toluene and then dried under vacuum to obtain a hybrid supported catalyst as a solid powder. At this time, the mixing molar ratio of the first transition metal compound and the second transition metal compound was 7:1.

(A)

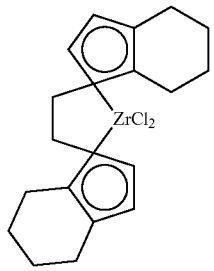

(C)

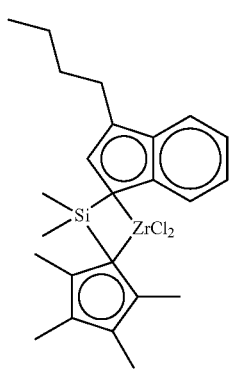

(4) Preparation of Olefin Polymer

The hybrid supported catalyst (10 mg) prepared above was weighted in a dry box and put in a 50 ml glass bottle. The bottle was sealed in a rubber diaphragm, taken out of the dry box, and a catalyst to be injected was prepared. The polymerization was carried out in a 600 ml metal alloy reactor for high pressure, equipped with a mechanical stirrer and capable of temperature control.

Hexane solution (400 ml) in which 1.0 mmol of triethylaluminum was dissolved, the hybrid supported catalyst (10 mg) prepared above and 1-hexane (33 ml) were added to the reactor without contact with air. Then, the polymerization was carried out with stirring for 1 hour at 70° C., while continuously applying a gaseous ethylene monomer at a pressure of 30 kgf/cm$^2$. After the stirring was stopped, unreacted ethylene was removed by evacuation and the resultant reaction product was filtered to remove the polymerization solvent and dried in a vacuum oven at 80° C. for 4 hours to obtain ethylene-1-hexene copolymer.

Example 2: Preparation of Hybrid Supported Catalyst and Olefin Polymer Using the Same (1) Preparation of a Support and (2) Preparation of a Cocatalyst-Supported Support The procedure was carried out in the same manner as in Example 1.

(3) Preparation of a Hybrid Supported Support

A hybrid supported catalyst was prepared in the same manner as in Example 1, except that the compound (D) prepared in Synthesis Example 4 was used as the second transition metal compound during preparation of the hybrid supported catalyst in (3) of Example 1.

(4) Preparation of Olefin Polymer

Ethylene-1-hexene copolymer was prepared in the same manner as in (4) of Example 1, except that the hybrid supported support prepared above was used and the procedure was carried out under the conditions shown in Table 1 below.

Example 3: Preparation of Hybrid Supported Catalyst and Olefin Polymer Using the Same (1) Preparation of a Support and (2) Preparation of a Cocatalyst-Supported Support The procedure was carried out in the same manner as in Example 1.

(3) Preparation of a Hybrid Supported Support

A hybrid supported catalyst was prepared in the same manner as in Example 1, except that the compound (B) prepared in Synthesis Example 2 was used as the first transition metal compound during the preparation of the hybrid supported catalyst in (3) of Example 1.

(4) Preparation of Olefin Polymer

Ethylene-1-hexene copolymer was prepared in the same manner as in (4) of Example 1, except that the hybrid supported support prepared above was used and the procedure was carried out under the conditions shown in Table 1 below.

Example 4: Preparation of Hybrid Supported Catalyst and Olefin Polymer Using the Same (1) Preparation of a Support and (2) Preparation of a Cocatalyst-Supported Support The procedure was carried out in the same manner as in Example 1.

(3) Preparation of a Hybrid Supported Support

A hybrid supported catalyst was prepared in the same manner as in Example 1, except that the compound (B) prepared in Synthesis Example 2 was used as the first transition metal compound and the compound (D) prepared in Synthesis Example 4 was used as the second transition metal compound, during preparation of the hybrid supported catalyst in (3) of Example 1.

(4) Preparation of Olefin Polymer

Ethylene-1-hexene copolymer was prepared in the same manner as in (4) of Example 1, except that the hybrid supported support prepared above was used and the procedure was carried out under the conditions shown in Table 1 below.

Comparative Example 1: Preparation of Supported Catalyst and Olefin Polymer Using the Same (1) Preparation of a Support and (2) Preparation of a Cocatalyst-Supported Support The procedure was carried out in the same manner as in Example 1.

(3) Preparation of a Supported Support

A hybrid supported catalyst was prepared in the same manner as in Example 1, except that only the first transition metal compound (A) was used alone in (3) of Example 1.

(4) Preparation of Olefin Polymer

Ethylene-1-hexene copolymer was prepared in the same manner as in (4) of Example 1, except that the hybrid supported support prepared above was used and the procedure was carried out under the conditions shown in Table 1 below.

Comparative Example 2: Preparation of Supported Catalyst and Olefin Polymer Using the Same (1) Preparation of a Support and (2) Preparation of a Cocatalyst-Supported Support The procedure was carried out in the same manner as in Example 1.

(3) Preparation of a Supported Support

A supported catalyst was prepared in the same manner as in Example 1, except that only the compound (B) was used alone as the transition metal compound in (3) of Example 1.

(4) Preparation of Olefin Polymer

Ethylene-1-hexene copolymer was prepared in the same manner as in (4) of Example 1, except that the supported support prepared above was used and the procedure was carried out under the conditions shown in Table 1 below.

Comparative Example 3: Preparation of Supported Catalyst and Olefin Polymer Using the Same (1) Preparation of a Support and (2) Preparation of a Cocatalyst-Supported Support The procedure was carried out in the same manner as in Example 1.

(3) Preparation of a Supported Support

A supported catalyst was prepared in the same manner as in Example 1, except that only the compound (C) was used alone as the transition metal compound in (3) of Example 1.

(4) Preparation of Olefin Polymer

Ethylene-1-hexene copolymer was prepared in the same manner as in (4) of Example 1, except that the supported support prepared above was used and the procedure was carried out under the conditions shown in Table 1 below.

Comparative Example 4: Preparation of Supported Catalyst and Olefin Polymer Using the Same (1) Preparation of a Support and (2) Preparation of a Cocatalyst-Supported Support The procedure was carried out in the same manner as in Example 1.

(3) Preparation of a Supported Support

A supported catalyst was prepared in the same manner as in Example 1, except that only the compound (D) was used alone as the transition metal compound in (3) of Example 1.

(4) Preparation of Olefin Polymer

Ethylene-1-hexene copolymer was prepared in the same manner as in (4) of Example 1, except that the supported support prepared above was used and the procedure was carried out under the conditions shown in Table 1 below.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Composition of transition metal compound | A/C | A/D | B/C | B/D | A | B | C | D |
| Ratio of transition metal compounds (Molar ratio) | 7:1 | 7:1 | 7:1 | 7:1 | alone | alone | alone | alone |
| Addition amount of $H_2$ (mol %) | 0.1 | 0.14 | 0.18 | 0.17 | 0.15 | 0.19 | 0 | 0.04 |

Test Example

The activities of the catalysts used in Examples 1 to 4 and Comparative Examples 1 to 4, and the physical properties of the olefin polymers prepared using the above catalysts are shown in Table 2 below.

(1) Catalytic activity (kgPE/gCat): The activities of the catalysts used in the respective Examples and Comparative Examples were calculated by measuring the weight of the catalysts used in the synthesis reaction of Examples and Comparative examples, and the weight of the polymers obtained from the above reaction.

(2) Mw, Mz, Mz/Mw: 10 mg of sample was pretreated with PL-SP260 in 1,2,4-trichlorobenzene containing 0.0125% BHT at 160° C. for 10 hours, and Mw (weight average molecular weight) and molecular weight distribution (MWD, Mw/Mn) were measured using PLGPC 220 at a measurement temperature of 160° C.

(3) $MI_{2.16}$ is and MFRR(21.6/2.16): Melt Index ($MI_{2.16}$) was measured according to standard ASTM D1238 (Condition E, 190° C., load of 2.16 kg). Melt Flow Rate Ratio (MFRR(21.6/2.16)) was calculated by dividing $MFR_{21.6}$ by $MFR_{2.16}$, $MFR_{21.6}$ was measured at a temperature of 190° C. under a load of 21.6 kg according to ISO 1133, and $MFR_{2.16}$ was measured at a temperature of 190° C. under a load of 2.16 kg according to ISO 1133.

(4) Melt Strength (mN): The melt strength of the olefin polymer was measured using Goettfert Rheotens 71.97 attached with a Model 3211 Instron capillary rheometer. The olefin polymer melts were discharged through a capillary die (plane die, angle of 180 degree) where a ratio (L/D) of length (L) to diameter (D) is 15. After equilibrating the sample at 190° C. for 10 minutes, the piston was moved at a rate of 1 inch/min (2.54 cm/min). The standard test temperature was 190° C. The sample was uniaxially attracted by a set of accelerating nips located below the die 100 mm at an acceleration of 1.2 mm/s². The tension was recorded as a function of the attractive speed of the nip roll. The melt strength was defined as the average value (mN) of the forces when the attractive forces were 100 mm/s and 150 mm/s. The following conditions were used for measuring the melt strength.

Plunger speed: 0.423 mm/s
Capillary die L/D: 15
Shear rate: 72/s
Wheel initial speed: 18 mm/s
Wheel acceleration: 1.2 mm/s²
Barrel diameter: 9.52 mm As a result of the tests, it was found that the olefin polymers of Examples 1 to 4 prepared using the hybrid supported catalyst according to the present invention exhibited significantly increased melt strength while having MWD equivalent to that of the olefin polymers of Comparative Examples 1 to 4 prepared using a catalyst on which one type of transition metal compound was supported alone. From these, it was confirmed that the olefin polymers of Examples 1 to 4 prepared using the hybrid supported catalyst according to the present invention had excellent bubble stability and blown film processability.

The invention claimed is:

1. A hybrid supported catalyst comprising:
one or more of a first transition metal compound represented by the following Chemical Formula 1;
one or more of a second transition metal compound represented by the following Chemical Formula 2; and
a support supporting the first and second transition metal compounds,
wherein the first transition metal compound and the second transition metal compound are contained in a mixing molar ratio of 7:1 to 3:1,

[Chemical Formula 1]

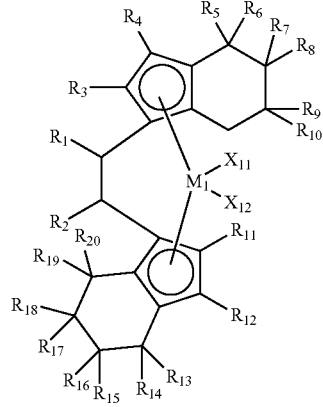

in the above Chemical Formula 1,
$M_1$ is Ti, Zr or Hf,
$X_{11}$ and $X_{12}$ are the same as or different from each other and each independently represent a halogen,

TABLE 2

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Activity (kgPE/gCat) | 4.7 | 4.5 | 4.3 | 4.1 | 4.2 | 3.7 | 8.4 | 7.1 |
| $MI_{2.16}$ | 0.98 | 0.89 | 1.08 | 0.89 | 0.91 | 0.87 | 13 | 0.95 |
| MFRR(21.6/2.16) | 60 | 56 | 58 | 53 | 42 | 40 | 3.9* | 25 |
| Mw (×10⁴ g/mol) | 10.2 | 11.1 | 10.7 | 11.5 | 10.5 | 11.2 | 2.1 | 12.5 |
| MWD | 3.1 | 3.2 | 3.1 | 3.2 | 2.9 | 2.9 | 2.2 | 2.4 |
| Melt strength (mN) | 65 | 60 | 63 | 57 | 40 | 38 | <10** | 48 |

In Table 2 above,
*The olefin polymer of Comparative Example 3 had too high $MI_{21.6}$ value and thus was not easy to measure MFRR(21.6/2.16), and thereby, MFR(5/2.16) value calculated by dividing $MFR_5$ by $MFR_{2.16}$ were described.
**The olefin polymer of Comparative Example 3 was not easy to measure the melt strength because the breaking occurred at an attractive force of 100 mm/s or less, and the values predicted from the test results measured were described.

R₁ and R₂ are each hydrogen, or are connected with each other to form an aliphatic ring having 3 to 10 carbon atoms, and R₃ to R₂₀ are each hydrogen;

[Chmeical Formula 2]

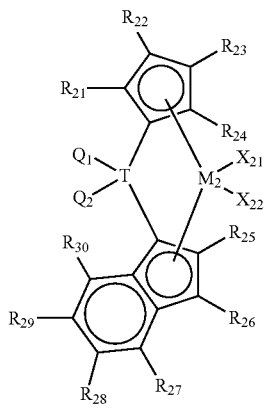

in the above Chemical Formula 2,

M₂ is Ti, Zr or Hf,

X₂₁ and X₂₂ are each independently represent a halogen,

R₂₁ to R₂₄ are each methyl;

R₂₅, and R₂₇ to R₃₀ are each hydrogen;

R₂₆ is butyl or phenyl;

T is Si, and

Q₁ and Q₂ are the same as or different from each other and each independently represent an alkyl group having 1 to 20 carbon atoms.

2. The hybrid supported catalyst of claim 1, wherein the first transition metal compound is any one of compounds represented by the following structural formulas:

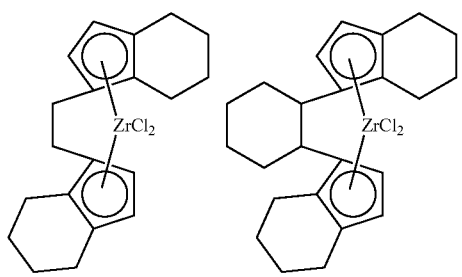

3. The hybrid supported catalyst of claim 1, wherein the second transition metal compound is any one of the compounds represented by the following structural formulas:

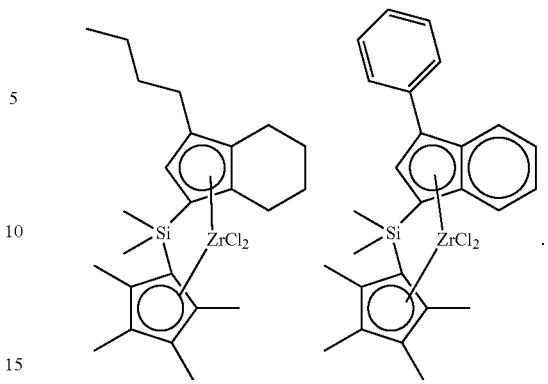

4. The hybrid supported catalyst of claim 1, wherein the first transition metal compound and the second transition metal compound are contained in a mixing molar ratio of 7:1.

5. The hybrid supported catalyst of claim 1, wherein the support includes any one selected from the group consisting of silica, alumina, and magnesia, or a mixture of two or more thereof.

6. The hybrid supported catalyst of claim 1, further comprising at least one cocatalyst selected from the group consisting of compounds represented by the following Chemical Formulas 3 to 5:

R₃₂—[Al(R₃₁)—O]ₙ—R₃₃    [Chemical Formula 3]

in the above formula 3,
R₃₁, R₃₂ and R₃₃ are each independently hydrogen, a halogen, a hydrocarbyl group having 1 to 20 carbon atoms or a hydrocarbyl group having 1 to 20 carbon atoms substituted with a halogen,
n is an integer of 2 or more, D(R₃₄)₃    [Chemical Formula 4]

in the above formula 4,
D is aluminum or boron,
each R₃₄ is independently a halogen, a hydrocarbyl group having 1 to 20 carbon atoms, a hydrocarbyloxy group having 1 to 20 carbon atoms, or a hydrocarbyl group having 1 to 20 carbon atoms substituted with a halogen,

[L-H]⁺[W(A)₄]⁻ or [L]⁺[W(A)₄]⁻    [Chemical Formula 5]

in the above formula 5,
L is a neutral or cationic Lewis base, H is a hydrogen atom,
W is a Group 13 element, each A is independently a hydrocarbyl group having 1 to 20 carbon atoms, or a hydrocarbyloxy group having 1 to 20 carbon atoms, each of which is optionally substituted with at least one substituent selected from a halogen, a hydrocarbyloxy group having 1 to 20 carbon atoms or a hydrocarbyl (oxy)silyl group having 1 to 20 carbon atoms.

7. A method for preparing an olefin polymer comprising a step of polymerizing an olefin monomer in the presence of the hybrid supported catalyst of claim 1.

8. The method for preparing an olefin polymer of claim 7, wherein the olefin monomer includes at least one selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene and 3-chloromethylstyrene.

\* \* \* \* \*